March 20, 1962  J. N. PRESTON  3,025,671
TORQUE AND PROPULSION REACTION ENGINE
Filed May 23, 1961  2 Sheets-Sheet 1
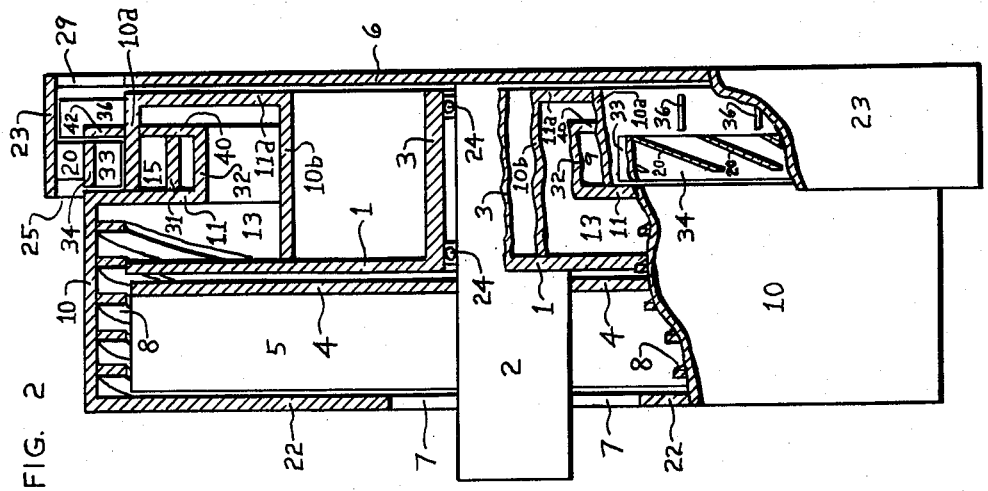
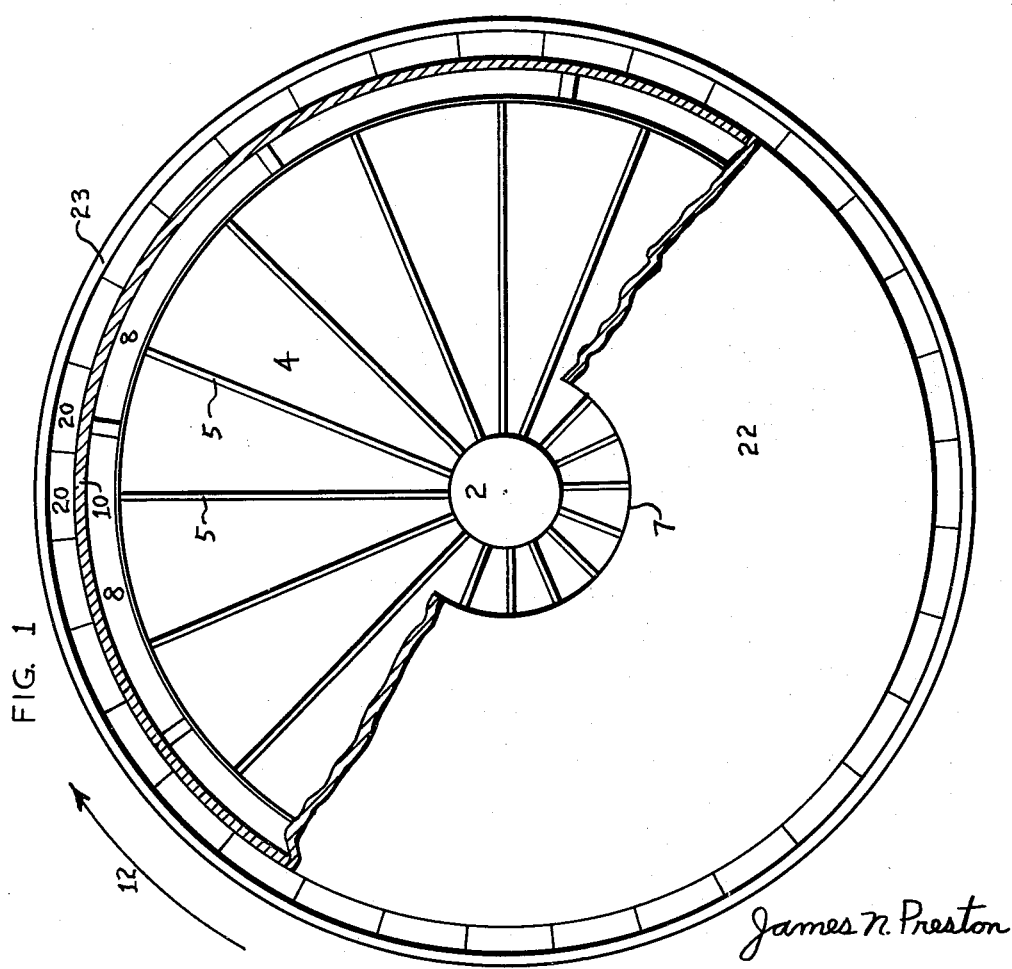
James N. Preston March 20, 1962 J. N. PRESTON 3,025,671
TORQUE AND PROPULSION REACTION ENGINE
Filed May 23, 1961 2 Sheets-Sheet 2

James N. Preston

United States Patent Office 3,025,671
Patented Mar. 20, 1962

3,025,671
TORQUE AND PROPULSION REACTION ENGINE
James N. Preston, 1633 W. Campbell, Phoenix, Ariz.
Filed May 23, 1961, Ser. No. 112,087
4 Claims. (Cl. 60—39.35)

This invention is a reaction engine that is designed to produce both torque and thrust for use as a lightweight, heavy-duty engine to power any kind of aircraft, industrial, automotive, or marine equipment that requires either torque or thrust or both. This engine is self-cooling as the combustion chamber is located within the compressed air chamber and over-heating is not a problem as it is to a turbine-driven engine. Compressed air from the air impelled vanes cools the outside of the combustion chamber before entering the combustion chamber in a preheated condition.

This engine is unique in that it derives its torque horsepower from the direct reaction of the combustion gases escaping from the combustion chamber at its exhaust ports into a back-pressure assembly which greatly increases the pressure of the exhaust gases and also increases the rotor velocity to equal that of the exhaust gases with the result that much greater torque horsepower is delivered per rotor revolution with a subsequent saving in fuel consumption.

The design of this engine prevents any of its component parts from being melted or burned up by the superheated exhaust gases and at the same time produces torque horsepower more efficiently with less engine weight and with less fuel consumption per horsepower unit delivered than a turbine driven engine.

Maximum propulsion thrust is achieved in the engine from the bending of the combustion exhaust gases 90 degrees and from the air propulsion vanes. A small lightweight engine can supply enough thrust to carry a human being through the air when strapped on as a flying belt.

FIG. 1 shows the front view of the engine with part of the engine housing cut away.

FIG. 2 shows the adjacent side view of the engine when the front view is rotated 90 degrees to its right on its vertical axis with part of the engine housing cut away.

Figures 3, 4:
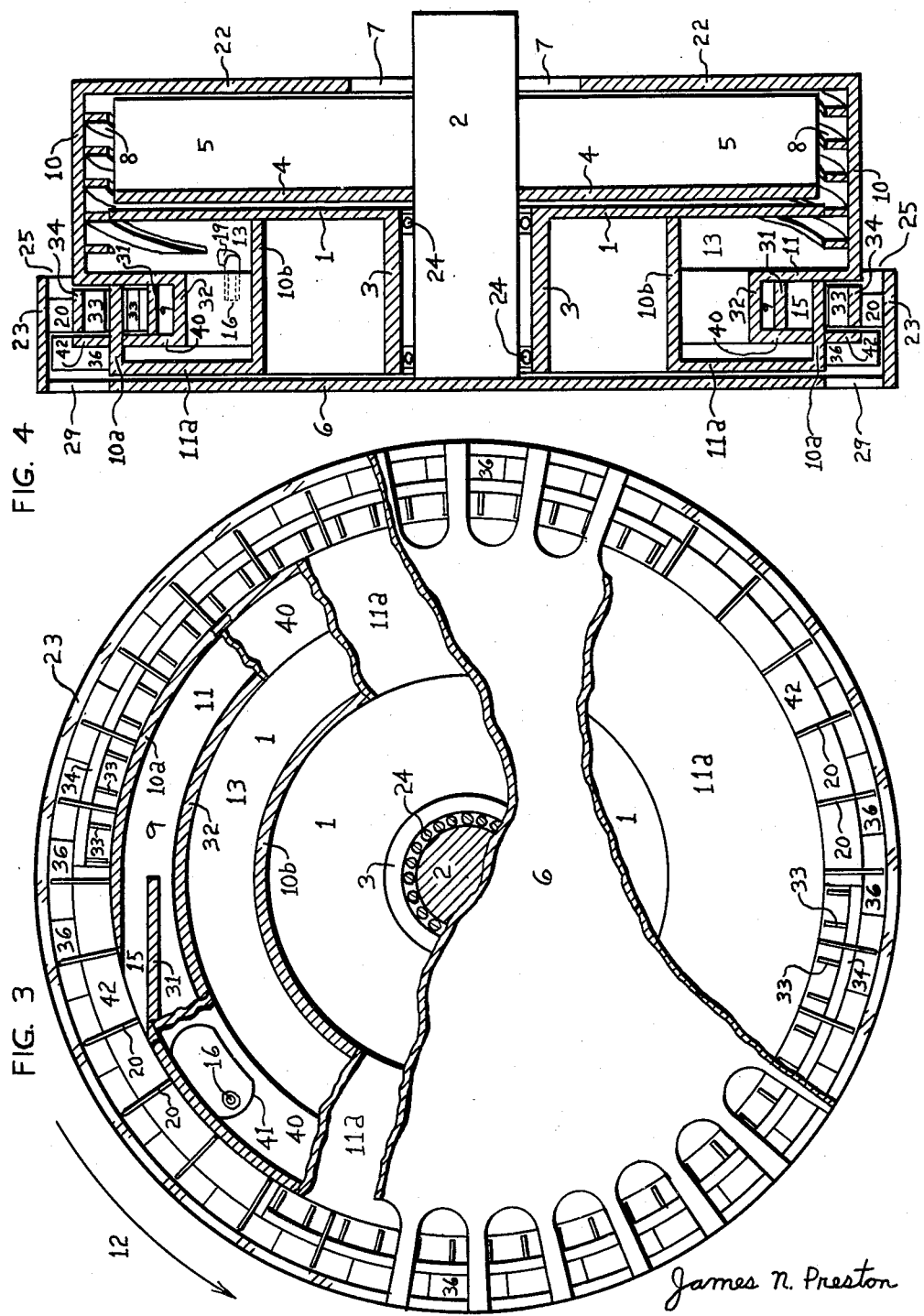
FIG. 3 shows the rear view of the engine when the front view is rotated 180 degrees on its vertical axis with part of the engine housing cut away.
FIG. 4 shows the side view of the engine when the front view is rotated 270 degrees to its right on its vertical axis with part of the engine housing cut away.

Referring to the drawing in more detail, 6 generally indicates the back-pressure disc which is centered to the axis of the right circular axle 2 and affixed at its adjacent face to the right circular end of said axle 2 in a plane perpendicular to the axis of said axle 2. Said axle 2 rotates on the bearings 24 within the right circular cylindrical hub 3.

One right circular end of the hub 3 is closely parallel adjacent to the back pressure disc 6. At the opposite end of said hub 3, the stationary air deflector disc 1 is centered around and affixed to the periphery of said hub 3 in a plane perpendicular to the axis of the axle 2 and flush with the right circular end of the hub 3.

The air impeller disc 4 is centered around and affixed to the periphery of the axle 2 in a plane perpendicular to the axis of said axle 2 and closely parallel adjacent to the face of the stationary air deflector disc 1 with a slightly smaller diameter than that of said stationary air deflector disc 1.

A number of air impeller vanes 5 are radially affixed to the face of the air impeller disc 4; each said vane 5 extending perpendicular from the face of said disc 4 for a distance along the axle 2 to a line in a plane which is parallel to the face of said disc 4. Each air impeller vane 5 extends radially outward from the periphery of the axle 2 to a perimeter having a radius from the axis of the axle 2 equal to that of the air impeller disc 4.

The impeller housing end disc 22 has the circular air intake port 7 cut out of its axial center and is then centered around the axle 2 in a plane perpendicular to the axis of said axle 2 and closely adjacent to the air impeller vanes 5. The radius of the said impeller housing end disc 22 is greater than the radius of the air impeller disc 4 and that of the stationary air deflector disc 1.

The right circular impeller housing cylinder 10 is affixed at one right circular end to the perimeter of the impeller housing end disc 22 and extends along a line horizontally parallel to the axis of the axle 2, across the plane of the air impeller vanes 5, the basic air impeller disc 4, and beyond the plane of the stationary air deflector disc 1 for a distance. The outer perimeter of the housing ring disc 11 is affixed to the right circular open end of the impeller housing cylinder 10. Said housing ring disc 11 extends for a distance on a perpendicular radial line toward the axis of the axle 2; its inner perimeter having a smaller radius than the stationary air deflector disc 1.

A number of spiral air deflector rings 8 extend for a distance from the axis-toward face of the impeller housing cylinder 10 toward the axis of the axle 2 to a radius from said axis equal to that of the stationary air deflector disc 1. The axis-toward face of each said spiral air deflector ring 8 is affixed to the periphery of the stationary air deflector disc 1 as it extends from the face of the impeller housing end disc 22 in a spiral clockwise 12 direction around the axis-toward face of the impeller housing cylinder 10, closely adjacent across the periphery of the air impeller vanes 5, to a point near the housing ring disc 11.

The right circular compression housing cylinder 10a, having a smaller diameter than the impeller housing cylinder 10 is centered around the axis of the axle 2 and affixed at one right circular end to the outside face of the housing ring disc 11 and extends for a distance on a line parallel to the axis of the axle to a line in a plane parallel to said housing ring disc 11 and perpendicular to the axis of the axle 2.

The right circular inner housing cylinder 10b having a smaller diameter than the compression housing cylinder 10a, is affixed to the face of the stationary air deflector disc 1 and extends along a line parallel to the axis of the axle 2 to a line in the plane of termination of the compression housing cylinder 10a.

The axis-toward perimeter of the compression ring disc 11a is affixed to the right circular open end of the inner housing cylinder 10b; extending outward in a plane perpendicular to the axis of the axle 2, its outer perimeter is affixed to the right circular open end of the compression housing cylinder 10a.

The intake air from the air intake port 7 is given a high clockwise 12 velocity by the air impeller vanes 5 and forced outward by centrifugal force beyond the periphery of said air impeller vanes 5 and against the axis-toward face of the impeller housing cylinder 10. The spiral air deflector rings 8 channel the intake air, rotating clockwise 12 along the inner face of said impeller housing cylinder 10, in a spiral clockwise 12 direction past the periphery of the stationary air deflector disc 1 into the air compression chamber 13 which is bounded by the stationary air deflector disc 1, the spiral air deflector rings 8, the impeller housing cylinder 10, the housing ring disc 11, the compression housing cylinder 10a, the compression ring disc 11a, and the inner housing cylinder 10b.

The combustion chamber 9 is located around the axis toward face of the compression housing cylinder 10a between the housing ring disc 11 and the combustion ring disc 40 which is affixed at its periphery to the axis-toward face of the compression housing cylinder 10a and extends toward the axis of the axle 2 in a plane parallel adjacent to the compression ring disc 11a to an inner perimeter having a radius equal to that of the housing ring disc 11.

The periphery of the right circular combustion housing cylinder 32 is affixed to the axis-toward face of the housing ring disc 11 and extends from the said housing ring disc 11 to the combustion ring disc 40 along a line parallel to the axis of the axle 2 and between the compression housing cylinder 10a and the inner housing cylinder 10b.

A number of combustion exhaust ports 15 are cut through the compression housing cylinder 10a extending from the housing ring disc 11 to the combustion ring disc 40. From a point at a counter-clockwise distance from each said combustion exhaust port 15 and on a radius line at a radial distance from the axis-toward face of the compression housing cylinder 10a toward the axis of the axle 2, a combustion exhaust baffle 31 extends on a line perpendicular to said radius at said point, to the clockwise 12 side of each combustion exhaust port 15. Each said combustion exhaust baffle 31 is affixed to, and extends perpendicular from, the housing ring disc 11 to the opposing inner face of the combustion ring disc 40.

A combustion air intake port 16 opens into the combustion chamber 9 through the wall of each combustion ring disc 40 on the clockwise 12 side of each combustion exhaust port 15, extending from the compression housing cylinder 10a to the combustion housing cylinder 32 and for a clockwise 12 distance. The fuel intake jet 16 opens into the combustion chamber 9 at the clockwise 12 side of each said combustion air intake port 16 through the housing ring disc 11 from the fuel pipe 19.

The combustion chamber 9 is bounded by the housing ring disc 11, the compression housing cylinder 10a, the combustion ring disc 40, the combustion housing cylinder 32, the exhaust ports 15, the combustion exhaust baffles 31, the combustion air intake port 41, and the fuel intake jet 16. The compressed air within the air compression chamber 13 cools the outside of the combustion chamber 9 before it enters the said combustion chamber 9 through each air intake port 41 in a pre-heated condition. It then mixes with the fuel from the fuel intake jet 19 and ignites. The ignited and expanding gases are forced by the combustion exhaust baffles 31 to exhaust from the combustion chamber 9 in a clockwise 12 tangent direction.

The back pressure disc 6 has a greater diameter than that of the impeller housing cylinder 10. One right circular end of the right circular propulsion housing cylinder 23 is affixed to the perimeter of the back pressure disc 6 and extends along a line parallel to the axis of the axle 2 across the plane of the compression housing cylinder 10 and for a distance across the plane of the impeller housing cylinder 10 to a line in a plane parallel to the back pressure disc 6.

One right circular end of the right circular back pressure cylinder 34 is centered about the axis of the axle 2 and is closely parallel adjacent to the face of the housing ring disc 31 and extends horizontally parallel to the axis of the axle 2 to a line in a plane closely parallel adjacent to the adjacent face of the combustion ring disc 40. The diameter of said cylinder 34 is generally the same as that of the impeller housing cylinder 10; said cylinder 34 is held in place by a number of affixed air propulsion vanes 20 which extend radially outward to the axis-toward face of the propulsion housing cylinder 23 and are angled in such a way as to force air from the propulsion air intake port 25 toward the back pressure disc 6 when said back pressure disc 6 rotates in a clockwise 12 direction.

A number of back pressure vanes 33 are affixed to the axis-toward face of the back pressure cylinder 34 and extend in a radial direction toward the axis of the axle 2 to a line closely parallel adjacent to the periphery of the compression housing cylinder 10a. Each said vane 33 extends from a line closely parallel adjacent to the face of the housing ring disc 11 along a line parallel to the axis of the axle 2 to a line in a plane closely parallel adjacent to the adjacent face of the back pressure arc plate 42 which is affixed to the periphery of the compression housing cylinder 10a in the same plane as the combustion ring disc 40. Said arc plate 42 extends radially outward to a perimeter having a radius equal to that of the periphery of the back pressure cylinder 34 in the vicinity of each combustion exhaust port 15 and for a distance on the clockwise 12 and counter-clockwise side of each combustion exhaust port 15.

The combustion exhaust gases escape from the combustion chamber 9 in a clockwise 12 tangent direction through the combustion exhaust ports 15 and is prevented from freely escaping further by the back pressure assembly which is composed of the axis-toward face of the back pressure cylinder 34, the housing ring disc 11, the periphery of the compression housing cylinder 10a, the back pressure arc plate 42, and the back pressure vanes 33. Said back pressure assembly causes the combustion exhaust gases leaving the combustion chamber 9 in a clockwise 12 tangent direction to back up and impart a high-pressure clockwise torque to the back pressure assembly and back pressure disc 6 to produce a high degree of torque horsepower at the axle 2 with a high degree of efficiency.

The back pressure of the combustion exhaust gases escape from the back pressure assembly toward the back pressure disc 6 immediately after leaving the region of each back pressure arc plate 42 and the back pressure vanes 33 are cooled by the air pumped into the vicinity by the propulsion vanes 20 in the region between each back pressure arc plate 42.

A number of propulsion air deflector vanes 36 are affixed to the periphery of the compression housing cylinder 10a and extend radially outward to a perimeter that has a radius slightly smaller than that of the axis-toward face of the propulsion housing cylinder 23. Said propulsion air deflector vanes 36 extend from a plane closely parallel adjacent to the plane of the air propulsion vanes 20 along a line parallel to the axis of the axle 2 to a plane parallel adjacent to the back pressure disc 6 to channel propulsion air from the air propulsion vanes 20 and exhaust gases from the back pressure assembly toward the back pressure disc 6.

A number of exhaust portals 29 are cut around the perimeter of the back pressure disc 6 to allow propulsion air from the air propulsion vanes 20 and exhaust gases from the back pressure assembly to pass through said back pressure disc 6 for the purpose of providing propulsion thrust. Each exhaust portal 29 extends from a radius less than the perimeter of the compression housing cylinder 10a along a radial line to the axis-toward face of the propulsion housing cylinder 23 and for a clockwise 12 distance.

I claim:

1. An axle rotating clockwise on bearings within a hub and having a back pressure disc centered and affixed to one right circular end and an air impeller disc centered and affixed to the opposite end of said axle, each disc rotating clockwise with the axle in a plane perpendicular to the axis of the axle and closely parallel adjacent to each adjacent right circular end of the hub; the air impeller disc having a smaller diameter than the back pressure disc and having a number of air impeller vanes radially affixed to, and extending perpendicular from, its face on the side away from the hub; each said air impeller vane extending from the axle to a perimeter having the same radius as that of the air impeller disc; the impeller housing end disc having the circular air intake port cut out of its axial center being centered about the axis of the axle in a plane perpendicular to the axis of said axle and closely adjacent to the air impeller vanes; the right circular impeller housing cylinder having a greater diameter than that of the air impeller disc, being affixed to the perimeter of the impeller housing end disc and extending along a line parallel to the axis of the axle, across the plane of the air impeller vanes and beyond the plane of the air impeller disc for a distance; the outer perimeter of a housing ring disc being affixed to the right circular open end of the impeller housing cylinder and extending for a distance on a perpendicular radial line toward the axis of the axle and terminating at an inner perimeter having a smaller radius than that of the air impeller disc; a number of spiral air deflector rings extending for a distance from the axis-toward face of the impeller housing cylinder toward the axis of the axle to a perimeter having a radius from said axis slightly greater than that of the air impeller vanes; each said spiral air deflector ring extending from the face of the impeller housing end disc in a spiral clockwise direction around the axis-toward face of the impeller housing cylinder and closely adjacent across the periphery of the air impeller vanes to a point near the housing ring disc; the air deflector disc being centered around and affixed to the periphery of the hub in a plane closely parallel adjacent to the air impeller disc and extending outward to the axis-toward faces of the spiral air deflector rings to hold the impeller housing cylinder in place; a right circular compression housing cylinder, having a smaller diameter than the impeller housing cylinder, being centered around the axis of the axle and affixed at one right circular end to the outside face of the housing ring disc and extending for a distance along a line parallel to the axis of the axle to a line in a plane parallel to said housing ring disc and perpendicular to the axis of the axle; the right circular inner housing cylinder having a smaller diameter than the compression housing cylinder, being centered and affixed to the face of the stationary air deflector disc and extending along a line parallel to the axis of the axle to a line in the plane of termination of the compression housing cylinder; the axis-toward perimeter of a compression ring disc being affixed to the right circular open end of the inner housing cylinder; extending outward in a plane perpendicular to the axis of the axle, its outer perimeter being affixed to the right circular open end of the compression housing cylinder; the intake air from the air intake port being given a high clockwise velocity by the air impeller vanes and forced outward by centrifugal force beyond the periphery of said air impeller vanes and against the axis-toward face of the impeller housing cylinder; the spiral air deflector rings channel the intake air rotating clockwise around the inner face of said impeller housing cylinder, in a spiral clockwise direction past the periphery of the stationary air deflector disc into the air compression chamber which is bounded by the stationary air deflector disc, the spiral air deflector rings, the impeller housing cylinder, the housing ring disc, the compression housing cylinder, the compression ring disc, and the inner housing cylinder; one right circular end of the right circular propulsion housing cylinder being affixed to the perimeter of the back pressure disc and extending along a line parallel to the axis of the axle across the plane of the compression housing cylinder and for a distance across the plane of the impeller housing cylinder to a line in a plane parallel to the back pressure disc; the propulsion air intake port extending from the periphery of the impeller housing cylinder to the axis-toward face of the propulsion housing cylinder.

2. A combustion chamber located within the air compression chamber of claim 1, adjoining the axis-toward face of the compression housing cylinder between the housing ring disc and a combustion ring disc which is affixed at its periphery to the axis-toward face of the compression housing cylinder and extending toward the axis of the axle in a plane parallel adjacent to the compression ring disc, terminating at an inner perimeter having a radius equal to that of the housing ring disc; the periphery of a right circular combustion cylinder being affixed to the axis-toward face of the housing ring disc and extending from the said housing ring disc to the combustion ring disc along a line having a radius between that of the compression housing cylinder and that of the inner housing cylinder; a number of combustion exhaust ports being cut through the compression housing cylinder extending from the housing ring disc to the combustion ring disc; from a point at a counterclockwise distance from each said combustion exhaust port and on a radius line at a radial distance from the axis-toward face of the compression housing cylinder toward the axis of the axle, a combustion exhaust baffle extending on a line perpendicular to said radius at said point, to the clockwise side of each combustion exhaust port; each said combustion exhaust baffle being affixed to, and extending perpendicular from, the housing ring disc to the opposing inner face of the combustion ring disc; a combustion air intake port opening into the combustion chamber through the wall of each combustion ring disc on the clockwise side of each combustion exhaust port, extending from the compression housing cylinder to the combustion housing cylinder and for a clockwise distance; the fuel intake jet opening into the combustion chamber at the clockwise side of each said combustion air intake port through the housing ring disc from the fuel pipe; the combustion chamber being bounded by the housing ring disc, the compression housing cylinder, the combustion ring disc, the combustion housing cylinder, the exhaust ports, the combustion exhaust baffles, the combustion air intake port, and the fuel intake jet; the compressed air within the air compression chamber cooling the outside of the combustion chamber before entering the said combustion chamber through each air intake port in a pre-heated condition and mixing with the fuel pumped in from the fuel intake jet; the ignited and expanding gases being forced by the combustion exhaust baffles to exhaust from the combustion chamber in a clockwise tangent direction.

3. Referring to claim 1, a combustion chamber located within the air compression chamber adjoining the axis-toward face of the compression housing cylinder and contained by said axis-toward face of the compression housing cylinder, the housing ring disc, a combustion ring disc which is adjoined at its periphery to the axis-toward face of the compression housing cylinder in a plane parallel adjacent to the housing ring disc, and a right circular combustion housing cylinder which has a radius somewhat smaller than that of the compression housing cylinder, extending from the adjoining housing ring disc to adjoin the axis-toward perimeter of the combustion ring disc; said combustion chamber being airtight except for a number of combustion exhaust ports cut through the compression housing cylinder, a number of combustion air intake ports cut through the combustion ring disc, and a number of fuel intake jets extending through the housing ring disc into the combustion chamber; a combustion exhaust baffle, extending perpendicular from the adjoining face of the housing ring disc to adjoin the adjacent face of the combustion ring disc, is affixed at one end to the compression housing cylinder adjoining the clockwise side of each combustion exhaust port and extends in a counter-clockwise direction for a distance on a line that is tangent to the periphery of the combustion inner cylinder to allow the combustion exhaust gases to escape from the combustion chamber in a clockwise tangent direction; one right circular end of a right circular back-pressure cylinder being centered about the axis of the axle and extending from a line in a plane closely parallel adjacent to the adjacent face of the housing ring disc, horizontally parallel along the axis of the axle to a line in a plane closely parallel adjacent to the plane of the combustion ring disc; the diameter of said back-pressure cylinder being generally equal to that of the impeller housing cylinder and is held in place by a number of affixed air propulsion vanes which extend radially outward to adjoin the axis-toward face of the propulsion housing cylinder and being angled in such a way as to force air from the propulsion air intake port, located at the open end of the propulsion housing cylinder, toward the back-pressure disc when said back-pressure disc rotates in a clockwise direction; a number of back-pressure vanes being affixed to the axis-toward face of the back-pressure cylinder and extending in a radial direction toward the axis of the axle to a perimeter having a slightly greater radius than has the periphery of the compression housing cylinder; each back-pressure vane extending from a line in a plane closely parallel adjacent to the adjacent face of the housing ring disc along a line parallel to the axis of the axle to a line in a plane closely parallel adjacent to the plane of the combustion ring disc; in the vicinity of each combustion exhaust port a back-pressure arc plate is affixed to the periphery of the compression housing cylinder in the plane of the combustion ring disc and extends radially outward, closely adjacent to the adjacent edges of the back-pressure vanes to a perimeter having a radius equal to that of the periphery of the back-pressure cylinder and for a distance on the clockwise and counter-clockwise side of each combustion exhaust port; the combustion exhaust gases escaping from the combustion chamber through each combustion exhaust port in a clockwise direction, enters the back-pressure assembly which is composed of the axis-toward face of the back-pressure cylinder, the housing ring disc, the periphery of the compression housing cylinder, a back-pressure arc plate, and the back-pressure vanes; the afore-described back-pressure assembly channels the combustion exhaust gases into the plane and influence of the back-pressure vanes for a distance to efficiently rotate said back-pressure vanes, the back-pressure disc, the axle, and air impeller assembly in a clockwise direction to produce torque and thrust.

4. Referring to claim 1 a number of air propulsion vanes are affixed to the axis-toward face of the propulsion housing cylinder and extend along radial lines for a distance toward the axis of the axle to adjoin the periphery of a back-pressure cylinder and being angled in such a way as to force air from the propulsion air intake port at the right circular open end of the propulsion housing cylinder, in an axial direction toward the back-pressure disc when said back-pressure disc rotates in a clockwise direction; a number of propulsion air deflector vanes are affixed to the periphery of the compression housing cylinder and extend radially outward to a perimeter having a radius slightly smaller than that of the axis-toward face of said propulsion housing cylinder; each said propulsion air deflector vane extending from a plane closely parallel adjacent to the plane of the air propulsion vanes along a line parallel to the axis of the axle to a plane parallel adjacent to the back-pressure disc to channel propulsion air from the air propulsion vanes and exhaust gases from the back-pressure assembly toward the back-pressure disc for the purpose of providing propulsion thrust; a number of exhaust portals are cut through the back-pressure disc, adjoining the periphery of said back-pressure disc, to allow propulsion air and combustion exhaust gases to pass through said back-pressure disc; each said exhaust portal extending from a perimeter having a radius less than that of the compression housing cylinder, along a radial line to the axis-toward face of the propulsion housing cylinder and for a clockwise distance.

References Cited in the file of this patent

UNITED STATES PATENTS 2,709,889    Mount   ---------------- June 7, 1955